United States Patent
Tan et al.

(10) Patent No.: US 7,245,219 B2
(45) Date of Patent: Jul. 17, 2007

(54) RFID TAG FOR AN OBJECT HAVING METALLIC PORTIONS, TAG COUPLER AND METHOD THEREOF

(75) Inventors: Geok Leong Tan, Singapore (SG); Mingzhe Du, Singapore (SG); Koo Song Low, Singapore (SG); Weng Sang-See Toh, Singapore (SG); Tiang Siong Lian, Singapore (SG)

(73) Assignee: FCI Smartag Pte. Ltd., Singapore (SG)

( * ) Notice: Subject to any disclaimer, the term of this patent is extended or adjusted under 35 U.S.C. 154(b) by 339 days.

(21) Appl. No.: 10/513,496

(22) PCT Filed: Aug. 6, 2003

(86) PCT No.: PCT/SG03/00188

§ 371 (c)(1),
(2), (4) Date: Nov. 5, 2004

(87) PCT Pub. No.: WO2004/046762

PCT Pub. Date: Jun. 3, 2004

(65) Prior Publication Data

US 2005/0151651 A1 Jul. 14, 2005

(30) Foreign Application Priority Data

Nov. 15, 2002 (SG) .............................. 200206895-5

(51) Int. Cl.
*G08B 13/14* (2006.01)

(52) U.S. Cl. ................................ 340/572.1; 340/572.2; 340/572.3

(58) Field of Classification Search ............. 340/572.1, 340/572.2, 572.3, 572.4, 572.5, 572.6, 572.7, 340/572.8, 572.9
See application file for complete search history.

(56) References Cited

U.S. PATENT DOCUMENTS

| | | | |
|---|---|---|---|
| 5,119,070 A * | 6/1992 | Matsumoto et al. ...... | 340/572.5 |
| 5,682,143 A * | 10/1997 | Brady et al. ............. | 340/572.7 |
| 5,826,328 A * | 10/1998 | Brady et al. ............. | 29/827 |
| 6,693,541 B2 * | 2/2004 | Egbert ..................... | 340/572.7 |
| 2004/0052203 A1 * | 3/2004 | Brollier .................... | 369/273 |
| 2004/0085190 A1 * | 5/2004 | Tuttle et al. ............... | 340/10.1 |
| 2006/0010463 A1 * | 1/2006 | Oshima et al. ............ | 720/718 |

* cited by examiner

*Primary Examiner*—Jeffery Hofsass
*Assistant Examiner*—Edny Labbees
(74) *Attorney, Agent, or Firm*—Lawrence YD Ho & Associates

(57) ABSTRACT

An RFID tag (20) has an electrically non-conductive substrate (22) with a mounting surface (24), an electrically conductive member (26), a conductive bridge (28), a dielectric strip (30), and a semiconductor device (32). The member (26) is mounted to the surface (24) and has an inner section (38), an outer section (40) and a connecting section (42). The section (38) has windings (44) and a free end (46) extending from one of the windings. The section (40) substantially surrounds the section (38) and has a winding (50) and a free end (52) that extends from a portion (54) of the winding (50) towards the section (38). A segment (56) of the section (42) is disposed between the ends (46, 52). The bridge (28) spans from the end (46) to the end (52). With the strip (30) disposed between the bridge (28) and the member (26), capacitive sections are thereby formed along the strip (30).

38 Claims, 5 Drawing Sheets

RFID TAG FOR AN OBJECT HAVING METALLIC PORTIONS, TAG COUPLER AND METHOD THEREOF

FIELD OF THE INVENTION

The present invention relates to RFID tags that are mounted onto objects. In particular, this invention relates to an RFID tag for an object having metallic portions, a tag coupler and method of forming the RFID tag or the tag coupler.

BACKGROUND OF THE INVENTION

In a radio frequency identification (RFID) system, RFID transponders or tags are usually mounted onto objects to provide information upon receiving interrogating signals transmitted by a transceiver. In the art, such a transceiver is referred to as a reader. Information provided by an RFID tag upon activation by an interrogating signal can include status, location, or presence of an object to which the RFID tag is mounted. Typically, such information is provided either with data extracted from a semiconductor device of the RFID tag or when the RFID tag interacts with an RF signal to generate a response signal back to the reader.

An RFID system has many different applications. For example, one common application of an RFID system is in electronic article surveillance (EAS) to detect movement of items within surveilled area. Typically, in such an RFID system, an active RFID tag attached to an item is deactivated when movement is authorized. Otherwise, if the active RFID tag is not deactivated, then an alert signal is generated by the RFID system when the item with an active RF tag is conveyed into an area where interrogating signals are present.

Interrogating signals transmitted to an RFID tag are received via an antenna. Such an antenna typically forms part of a resonant circuit of the RFID tag. Generally, the resonant circuit is tuned to a resonant frequency corresponding to the frequency of the interrogating signals. FIG. 1 illustrates a prior art RFID tag 10 having a substrate 12 with a semiconductor device 14 that is coupled to coil windings 16.

A problem with existing RFID tags is that objects with electromagnetic properties adversely affect resonant frequencies of these existing RFID tags. One technique of overcoming this problem is described in U.S. Pat. No. 5,276,431 Piccoli et al. in which a security tag has a resonant circuit that compensates for inherent capacitance of an article to thereby shift a resonant frequency of the resonant circuit closer to the center frequency of a detection frequency range. However, the resonant circuit described in U.S. Pat. No. 5,276,431 Piccoli et al. provides for a predetermined detection frequency range and, therefore, is not optimized for accurate detection of a specific detection frequency.

Another prior art RFID tag is described by U.S. Pat. No. 5,541,399 de Vail in which an RF transponder is fabricated on a single side of a substrate and has a lead line that yields capacitances in crossing over windings of an antenna for the RF transponder. Although this technique reduces cost of the RFID transponder that is easier to attach to many different types of packages, the total capacitance provided at crossover sites along the lead line is limited because of the width of the antenna windings. Hence, a discrete capacitor may still be needed to increase the total capacitance to attain a desired antenna resonant frequency.

Although the above existing RFID tags overcome various problems, there is still a need for a more effective RFID tag that is easier to manufacture and has a wider capacitive range without having to use discrete capacitors. Also, metallic portions of some objects or products are known to interfere RF or electromagnetic fields and this reduces effective range of RFID tags mounted to such objects. For example, metallic portions in compact discs and the like are known to disrupt RF or electromagnetic fields around RFID tags attached to the compact discs.

Furthermore, RF or electromagnetic fields of an RFID tag are typically weakened when the RFID tag is mounted to a metallic product such a compact discs and the like and housed within a carrier. In this situation, the RFID tag is less effective and this adversely affects sensing range of a reader that interrogates the RFID tag.

Therefore, what is needed is RFID tag that overcomes poor RF or electromagnetic fields when mounted to an object having metallic portions. What is also needed is a tag coupler for an RFID tag mounted to a metallic product to thereby improve detecting range of a reader that interrogates the RFID tag when the product is housed within a product carrier.

SUMMARY OF THE INVENTION

The present invention seeks to provide a radio frequency identification (RFID) tag, a tag coupler for the RFID tag and a method of forming the RFID tag or tag coupler.

Accordingly, in one aspect, the present invention provides a radio frequency identification (RFID) tag comprising:
a substantially planar and electrically non-conductive substrate having a mounting surface;
a substantially planar and electrically conductive member mounted to the mounting surface, the conductive member having:
    an inner section comprising:
        one or more windings;
        an inner section free end extending from one of the windings;
    an outer section, substantially surrounding the inner section, the outer section comprising:
        one or more windings;
        an outer section free end extending from one of the windings; and
    a connecting section connecting the inner section to the outer section;
a conductive bridge spanning from the inner section free end to the outer section free end; and
at least one dielectric strip disposed between the conductive bridge and the conductive member to thereby form one or more capacitive sections along the at least one dielectric strip.

In another aspect, the present invention provides a tag coupler for a radio frequency identification (RFID) tag housed within a product carrier, the tag coupler comprising:
an electrically conductive member having:
    an inner section comprising:
        one or more windings;
        an inner section free end extending from one of the windings;
    an outer section, substantially surrounding the inner section, the outer section comprising:
        one or more windings;
        an outer section free end extending from one of the windings; and a connecting section connecting the inner section to the outer section;

a conductive bridge spanning from the inner section free end to the outer section free end; and at least one dielectric strip disposed between the conductive bridge and the conductive member to thereby form one or more capacitive sections along the at least one dielectric strip.

In yet another aspect, the present invention provides a method of forming a radio frequency identification (RFID) tag, the method comprising:

providing a substantially planar and electrically non-conductive substrate having a mounting surface;

forming a substantially planar and electrically conductive member on the mounting surface, the conductive member having an inner section free end extending from an inner section and an outer section free end extending from an outer section, the inner section being connected via a connecting section to the outer section, the connecting section being disposed between the inner section free end and the outer section free end;

attaching at least one dielectric strip onto one or more portions of the conductive member; and printing a conductive bridge onto the at least one dielectric strip to thereby form one or more capacitive sections along the at least one dielectric strip.

BRIEF DESCRIPTION OF THE DRAWINGS

A preferred embodiment and alternate embodiments of the present invention is more fully described, by way of example, with reference to the drawings of which.

DETAILED DESCRIPTION OF THE DRAWINGS

A radio frequency identification (RFID) tag, a tag coupler for the RFID tag and a method of forming the RFID tag or the tag coupler in accordance with a preferred embodiment and alternate embodiments of the invention are described. In the following description, details are provided to describe these embodiments. It shall be apparent to one skilled in the art, however, that the invention may be practiced without such details. Some of these details may not be described at length so as not to obscure the invention.

There are many advantages of the invention. One advantage of the invention is that the RFID tag is more effective than existing RFID tags when mounted to objects with metallic portions. Consequently, undesired interference or disruption of radio frequency (RF) or electromagnetic field around the RFID tag by the metallic portions is alleviated.

Another advantage of the invention is that the tag coupler improves RF or electromagnetic coupling between a reader and an existing RFID tag mounted to a product carried within a product carrier. This therefore improves detecting range of the product without having to change the existing RFID tag already mounted to the product.

Yet another advantage of the invention is that the RFID tag supports a wider possible range of capacitances without needing discrete capacitors to increase total capacitance as required by existing RFID tags. Hence, the invention enables the RFID tag or the tag coupler to be more easily tuned to desired resonant frequencies than existing RFID tags.

In describing the embodiments of the invention, similar elements share the same references. To simplify the drawings, an element may not be numbered in a later drawing if the element has been indicated in an earlier drawing.

Figure 1:
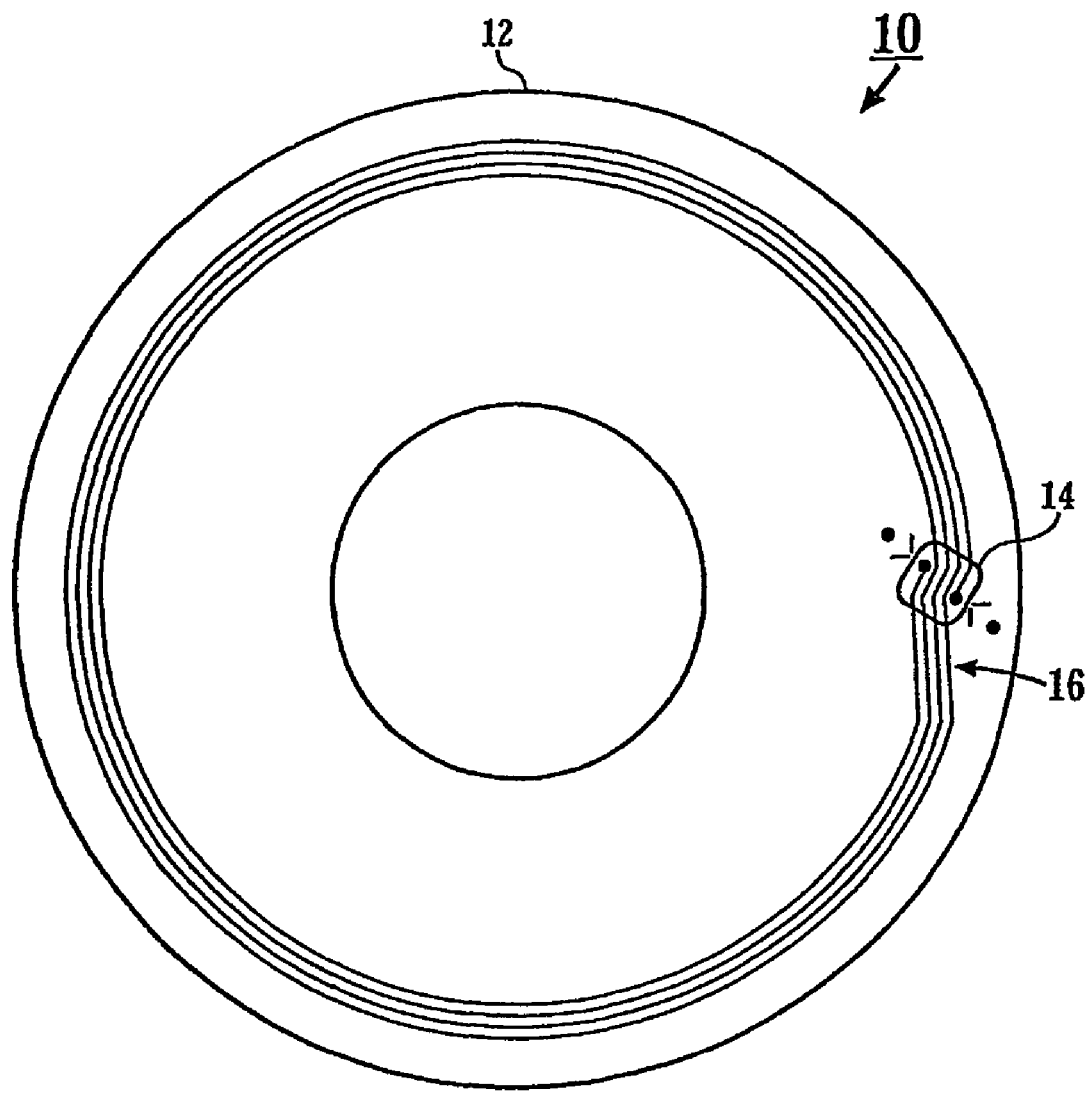
FIG. 1 illustrates a prior art RFID tag.
Figure 2:
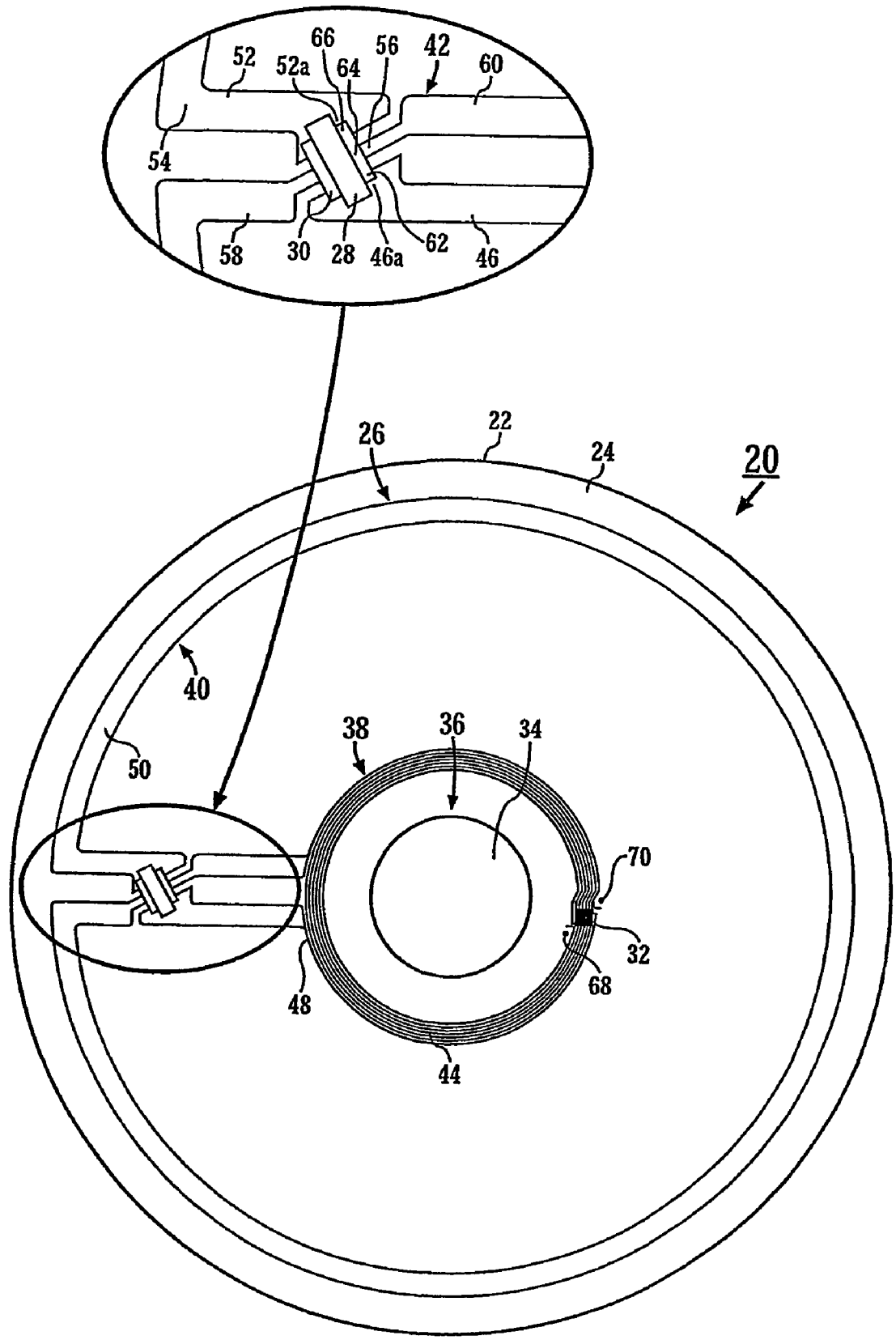
FIG. 2 illustrates an RFID tag in accordance with the preferred embodiment of the present invention.

Referring now to FIG. 2, an RFID tag 20 in accordance with the preferred embodiment of the present invention is illustrated. The RFID tag 20 comprises a substantially planar and electrically non-conductive substrate 22 having a mounting surface 24, a substantially planar and electrically conductive member 26, a conductive bridge 28, a dielectric strip 30, and a semiconductor device 32. The substrate 22 has a spindle aperture 34 formed at a center portion 36. When mounted in alignment with the product such as, for example, a compact disc or the like, the spindle aperture 34 enables the compact disc to couple to a spindle in a disc drive or to internal engagement members of a disc product carrier.

The conductive member 26 is mounted to the mounting surface 24 and comprises an inner section 38, an outer section 40 and a connecting section 42 that connects the inner section 38 to the outer section 40. These sections 38,40,42 are formed with an electrically conductive material such as, for example, copper, silver, or gold.

The inner section 38 has windings 44 and an inner section free end 46 extending from one of the windings. In the preferred embodiment, the inner section free end 46 extends from an outermost winding 48 towards the outer section 40.

The outer section 40 substantially surrounds the inner section 38. In the preferred embodiment, the outer section 40 has a winding 50 and an outer section free end 52. This winding 50 of the outer section 40 is wider than each of the windings 44 of the inner section 38. The outer section free end 52 extends from a portion 54 of the winding 50 towards the inner section 38. It is to be noted that if the outer section 40 has more than one winding, then the outer section free end 52 extends from an innermost winding of the outer section 40 towards the inner section 38.

In connecting the inner section 38 to the outer section 40, a segment 56 of the connecting section 42 is disposed between the inner section free end 46 and the outer section free end 52. This segment 56 is smaller in width than other segments 58,60 of the connecting section 46 that respectively adjoin the inner section 38 and the outer section 40.

The conductive bridge 28 spans from the inner section free end 46 to the outer section free end 52. With the dielectric strip 30 disposed between the conductive bridge 28 and the conductive member 26, three capacitive sections are thereby formed along the dielectric strip 30. Specifically, a capacitive section 62 is formed at the portion 46a of the inner section free end 46, another capacitive section 64 is formed at the segment 56, and yet another capacitive section 66 is formed at the portion 52a of the outer section free end 52.

The semiconductor device 32 has two terminals (not shown) that are electrically connected to two conductive pads 68,70. These two conductive pads 68,70 are disposed in association with the windings 44 of the inner section 38 such that the windings 44 are electrically coupled to the two terminals of the semiconductor device 32. The semiconductor device 32 stores information on the product such that upon receiving interrogation signals from a reader, the information is provided or retrieved from the semiconductor device 32.

Dimensions of the RFID tag 20 depends on desired resonant frequency or a desired detection frequency range. For example, to receive interrogating signals at a desired resonant frequency of 13.56 Megahertz (MHz) within a 5% tolerance range, the winding 50 has a width of 3.1 millimeters (mm), the inner section 38 has seven windings 44 each having a 0.15 mm width, the capacitive sections 62,66 are each 3 mm by 1 mm, the conductive bridge 28 has a 3 mm width, and the dielectric strip 30 is 4.5 nm by 5 mm. The outer section 40 has an outer diameter of 110 mm and the inner section 38 has an outer diameter of 40 mm. The dielectric strip 39 for this example has a dielectric constant of 4.5. Typical capacitances at each of the three capacitive sections 62,64,66 are 6 picofarads (pF) each. It is to be noted that each of these dimensions varies in tolerance to provide the desired resonant frequency of 13.56 Megahertz (MHz) within the 5% tolerance range.

Figure 3:
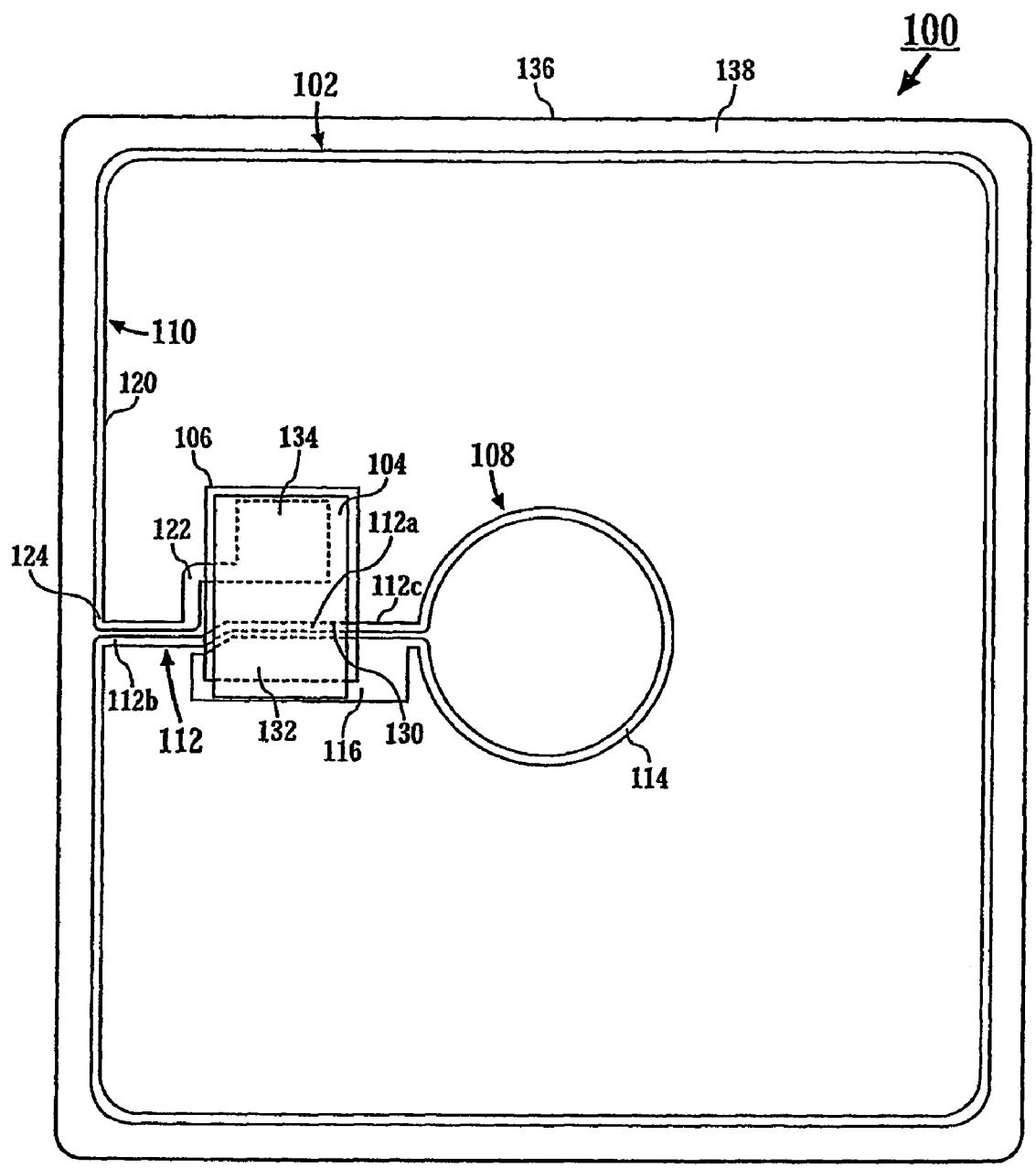
FIG. 3 illustrates a tag coupler for the RFID tag in accordance with an alternate embodiment of the present invention.

FIG. 3 illustrates a tag coupler 100 in accordance with an alternate embodiment of the present invention. The tag coupler 100 couples to the RF or electromagnetic field of an RFID tag mounted to a compact disc (CD) that is housed within a product carrier (not shown in FIG. 3). Such a product carrier can be, for example, a compact disc (CD) casing or a CD storage box.

The tag coupler 100 comprises an electrically conductive member 102, a conductive bridge 104, and a dielectric strip 106. The conductive member 102 comprises an inner section 108, an outer section 110 and a connecting section 112 that connects the inner section 108 to the outer section 110. These sections 108,110,112 are formed with an electrically conductive material such as, for example, copper, silver, or gold.

The inner section 108 has a winding 114 and an inner section free end 116 extending from the winding 114. In this alternate embodiment, the inner section 108 is substantially circular and the inner section free end 116 extends from the winding 114 towards the outer section 110. The inner section free end 116 is wider than the winding 114 of the inner section 108.

The outer section 110 substantially surrounds the inner section 108. In this alternate embodiment, the outer section 110 is non-circular to align with typical shapes of existing product carriers and has a winding 120 and an outer section free end 122. Width of the winding 120 of the outer section 110 is about the same as width of the winding 114 of the inner section 108. The outer section free end 122 extends from a portion 124 of the winding 120 towards the inner section 108. The outer section free end 122 is wider than the winding 120 of the outer section 110.

It is to be noted that if the inner section 108 has more than one winding, then the inner section free end 116 extends from an outermost winding towards the outer section 110. Similarly, if the outer section 110 has more than one winding, then the outer section free end 122 extends from an innermost winding towards the inner section 108.

In connecting the inner section 108 to the outer section 110, a segment 112*a* of the connecting section 112 is disposed between the free ends 116,122. Width of the segment 112*a* is about the same as width of other segments 112*b*,112*c* of the connecting section 112 that adjoin, respectively, the outer section 110 (at the portion 124) and the inner section 108.

The conductive bridge 104 spans from the inner section free end 116 to the outer section free end 122. With the dielectric strip 106 disposed between the conductive bridge 104 and the conductive member 102, capacitive sections are thereby formed along the dielectric strip 106 at the segment 112*a* of the connecting section 112, the inner section free end 116, and the outer section free end 122.

For the tag coupler 100, three capacitive sections are formed along the dielectric strip 106. Specifically, a capacitive section 130 is formed at the segment 112*a* of the connecting section 112, another capacitive section 132 is formed at the inner section free end 116, and yet another capacitive section 134 is formed at the outer section free end 122.

The tag coupler 100 is mountable to a substantially planar and electrically non-conductive substrate 136 having a mounting surface 138. The non-conductive substrate 136 may be a discrete element, or provided by a part of the product or the product carrier. For example, the conductive member 102 may be mounted directly onto a CD casing with a surface that serves as the mounting surface 138.

Dimensions of the tag coupler 100 also depend on desired resonant frequency or a desired detection frequency range. For interrogating signals at the desired resonant frequency of 13.56 Megahertz (MHz) within a 5% tolerance range, the windings 120 each has a width of 1 millimeter (mm), the capacitive section 130 is 1 mm by 16 mm, the capacitive section 132 is 5 mm by 16 mm, the capacitive section 134 is 10 mm by 13 mm, the conductive bridge 104 is 25 mm by 16 mm, and the dielectric strip 106 is 24 mm by 18 mm. The outer section 110 forms an inner area of 120 mm by 110 mm and the inner section 108 has an inner diameter of 32 mm. The dielectric strip 106 for this example also has a dielectric constant of 4.5. Typical capacitances at each of the three capacitive sections 130,132,134 are 32 pF, 159 pF and 259 pF, respectively. It is to be noted that each of these dimensions varies in tolerance to provide the desired resonant frequency of 13.56 Megahertz (MHz) within the 5% tolerance range.

Figure 4:
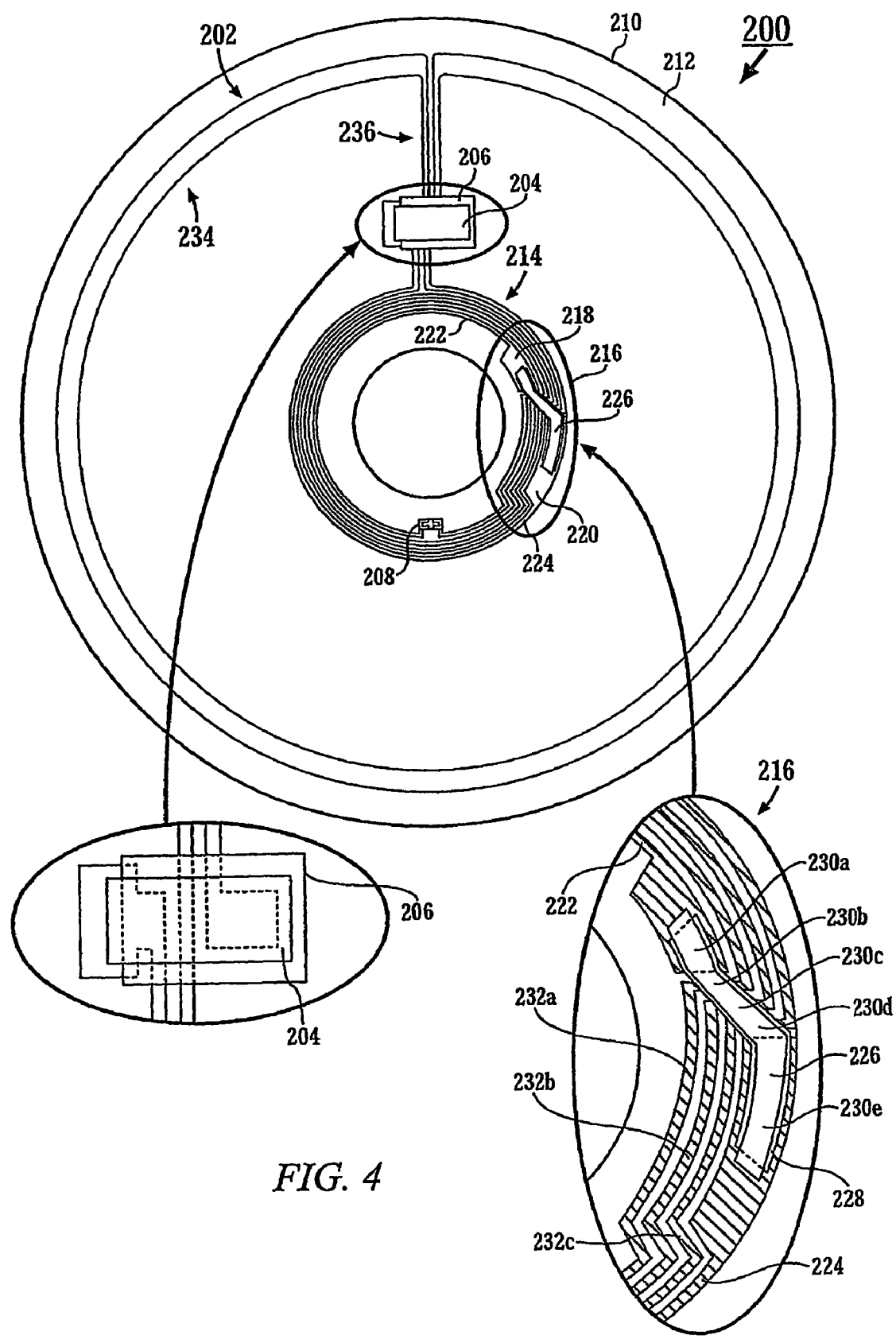
FIG. 4 illustrates an RFID tag in accordance with yet another alternate embodiment of the present invention.

FIG. 4 illustrates an RFID tag 200 in accordance with yet another alternate embodiment of the present invention. It is to be noted that the RFID tag 200 has certain features that are similar to the RFID tag 20. The RFID tag 200 is mountable to either a metallic product or a product carrier for the metallic product.

The RFID tag 200 comprises an electrically conductive member 202, a conductive bridge 204, a dielectric strip 206, and a semiconductor device 208. Specific details of the conductive member 202, the conductive bridge 204, the dielectric strip 206, and the semiconductor device 208 are not indicated or described here as these details are similar to the RFID tag 20 described earlier in the above.

The RFID tag 200 is mountable to a substantially planar and electrically non-conductive substrate 210 having a mounting surface 212. The non-conductive substrate 210 may be a discrete element, or provided by a part of the product or the product carrier. For example, the conductive member 202 may be mounted directly onto a surface of a CD or CD casing with that surface serving as the mounting surface 212.

The RFID tag 200 has inner section 214 that comprises an indented section 216. The indented section 216 has two free ends 218,220. Each of the two free ends 218,220 extends, respectively, from a winding 222,224 of the inner section 214. The indented section 216 comprises a conductive bridge 226 connecting the two free ends 218,220.

A dielectric strip 228 is disposed between the conductive bridge 226 and the two free ends 218,220 to thereby form five capacitive sections 230*a*,230*b*,230*c*,230*d*,230*e* along the dielectric strip 228. These capacitive sections 230 correspond to portions of the indented section 216 at which the dielectric strip 228 is disposed between the windings of the inner section 214 and the conductive bridge 226. The winding 222,224 of each of the two free ends 218,220 are separated by other windings 232a,232b,232c of the inner section 214 at the indented section 216.

It is to be noted that the RFID tag 200 has an outer section 234 and a connecting section 236 much like the RFID tag 20. At the connecting section 236, the conductive bridge 204 and the dielectric strip 206 also form one or more capacitive sections.

Figure 5:
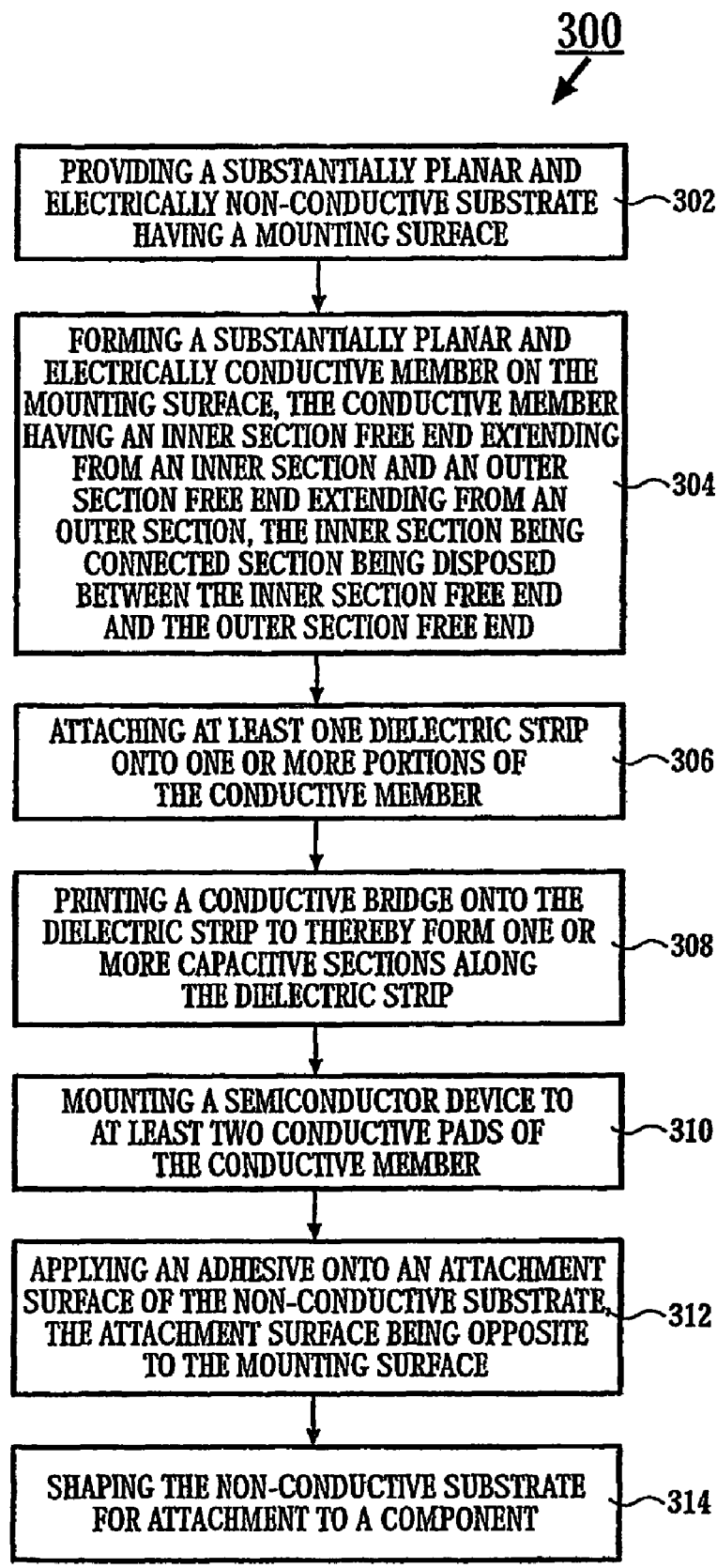
FIG. 5 is a flowchart of a method of forming the RFID tag of FIG. 2 or FIG. 4 and the tag coupler of FIG. 3.

Referring now to FIG. 5, a flowchart of a method 300 of forming the RFID tag 20, the tag coupler 100, or the RFID tag 200 is shown in accordance with yet another alternate embodiment of the invention. It is to be noted that some elements in the following description of the method 300 are not referenced as such elements refer generally to elements described earlier and that are related to the RFID tag 20, the tag coupler 100, or the RFID tag 200.

The method 300 starts by providing 302 a substantially planar and electrically non-conductive substrate having a mounting surface. The non-conductive substrate can be, for example, a polyester sheet.

The method 300 continues with forming 304 a substantially planar and electrically conductive member on the mounting surface. The conductive member has an inner section free end extending from au inner section and an outer section free end extending from an outer section. The inner section is connected via a connecting section to the outer section as described earlier for the RFID tag 20, the tag coupler 100 and the RFID tag 200. The connecting section is disposed between the inner section free end and the outer section free end.

For the RFID tag 200, the forming 304 comprises forming the indented section 216 having the two free ends 218,220 at the inner section 214. Each of the two free ends 218,220 extends from the winding 222,224, respectively, of the inner section 214.

One technique of forming 304 the conductive member is by laminating a conductive material onto the mounting surface and then etching the conductive material to thereby form the conductive member. Copper is one conductive material that can be used for this forming 304.

The method 300 continues with attaching 306 a dielectric strip onto one or more portions of the conductive member. Size and number of these portions are variable to obtain various resonant frequencies depending on design requirements of the RFID tag 20, the tag coupler 100, or the RFID tag 200 in terms of resonant frequency. This attaching 306 can be by printing the dielectric strip onto the one or more portions. In the preferred embodiment, the printing is onto a portion each of the connecting section, the inner section free end and the outer section free end. For the connecting section, the dielectric strip is necessary to insulate the conductive bridge from the segment between the inner section free end and the outer section free end. The attaching 306 also comprise curing the dielectric strip when necessary, depending on material used for the dielectric strip.

For the RFID tag 200, the attaching 306 comprise printing the dielectric strip 228 onto one or more portions of the indented section 216. Accordingly, the RFID tag 200 now has the two dielectric strips 206,228 that need curing.

After attaching the dielectric strip, the method 300 proceeds to printing 308 a conductive bridge onto the dielectric strip to thereby form capacitive sections along the dielectric strip as required by the design requirements of the RFID tag 20, the tag coupler 100, or the RFID tag 200. For the RFID tag 200, the conductive bridge is also printed onto at least one portion of the dielectric strip 228 to thereby form one or more capacitive sections along the dielectric strip 228 at the indented section 216.

Thereafter, mounting 310 of a semiconductor device to at least two conductive pads of the conductive member takes place. The method 300 then proceeds to applying 312 an adhesive onto an attachment surface of the non-conductive substrate. The attachment surface is opposite to the mounting surface.

After applying 312 the adhesive, the method 300 provides for shaping 314 the non-conductive substrate for attachment to a component Such a component may be, for example, a CD or a carrier for the CD. For a CD, the shaping 314 includes punching a spindle aperture at a center portion of the non-conductive substrate.

It is to be noted that the flowchart of FIG. 5 refer specifically to the method 300 of forming the RFID tag 20 and the RFID tag 200. However, for the tag coupler 100, the step of mounting 310 is not required. Therefore, the flowchart is also applicable to form the tag coupler 100, as it is easily understood by persons skilled in the art that the mounting 310 of a semiconductor device is not needed for the tag coupler 100.

The present invention therefore provides the RFID tag 20, the tag coupler 100, the RFID tag 200 and the method 300 to overcome, or at least alleviate, the problems of the prior art.

It shall be appreciated that although one preferred embodiment has been described in detail, various modifications and improvements can be made by persons skilled in the art without departing from the scope of the present invention.

The invention claimed is:

1. A radio frequency identification (RFID) tag comprising:
   a substantially planar and electrically non-conductive substrate having a mounting surface;
   a substantially planar and electrically conductive member mounted to said mounting surface, said conductive member having:
   an inner section comprising:
   one or more windings;
   a broken section between a first and a second open positions in one of said windings; and
   an inner section free end extending from said first open position;
   an outer section, being disposed near the edge of said mounting surface and substantially surrounding said inner section, said outer section comprising:
   one or more windings with the innermost winding being significantly separated from the outermost winding of said inner section with respect to the average pitch value of said inner section windings; the width of said outer section windings may be different from the width of said inner section windings; and
   an outer section free end extending from the outermost winding of said outer section;
   a connecting section connecting said second open position of said inner section to the innermost winding of said outer section;
   a conductive bridge crossing over a connecting segment within said connecting section and spanning from said inner section free end to said outer section free end; and at least one dielectric strip disposed between said conductive bridge and said conductive member to thereby form one or more capacitive sections along said at least one dielectric strip.

2. The RFID tag of claim 1, wherein said connecting segment is disposed between said inner section free end and said outer section free end.

3. The RFID tag of claim 2, wherein said capacitive sections comprise a capacitive section at a portion of said connecting segment.

4. The RFID tag of claim 3, wherein said capacitive sections further comprise another capacitive section at a portion of said inner section free end.

5. The RFID tag of claim 3, wherein said capacitive sections further comprise another capacitive section at a portion of said outer section free end.

6. The RFID tag of claim 1, and further comprising a semiconductor device having at least two terminals electrically and respectively connected to at least two conductive pads of said conductive member.

7. The RFID tag of claim 6, wherein said at least two conductive pads are disposed in association with said windings of said inner section.

8. The RFID tag of claim 1, wherein said inner section free end extends towards said outer section.

9. The RFID tag of claim 1, wherein said outer section free end extends towards said inner section.

10. The RFID tag of claim 1, wherein said connecting section extends from the outermost winding of said inner section to the innermost winding of said outer section.

11. The RFID tag of claim 1, wherein said non-conductive substrate has a spindle aperture formed at a center portion thereof.

12. The RFID tag of claim 1, wherein said inner section comprises an indented section, said indented section having two free ends, each of said two free ends extending from a winding of said inner section.

13. The RFID tag, of claim 12, wherein said indented section comprises a conductive bridge connecting said two free ends.

14. The RFID tag of claim 13, wherein at least one dielectric strip is disposed between said conductive bridge and said two free ends to thereby form one or more capacitive sections along said at least one dielectric strip.

15. The RFID tag of claim 13, wherein said winding of each of said two free ends are separated by other windings of said inner section at said indented section.

16. A tag coupler for a radio frequency identification (REID) tag housed within a product carrier, said tag coupler comprising:
an electrically conductive member having:
an inner section comprising:
one or more windings;
a broken section between a first and a second open positions in one of said windings; and
an inner section free end extending from said first open position;
an outer section, being disposed near the edge of said mounting surface and substantially surrounding said inner section, said outer section comprising:
one or more windings with the innermost winding being significantly separated from the outermost winding of said inner section with respect to the average pitch value of said inner section windings; and
an outer section free end extending from the outermost winding of said outer section;
a connecting section connecting said second open position of said inner section to the innermost winding of said outer section;
a conductive bridge crossing over a connecting segment within said connecting section and spanning from said inner section free end to said outer section free end; and
at least one dielectric strip disposed between said conductive bridge and said conductive member to thereby form one or more capacitive sections along said at least one dielectric strip.

17. The tag coupler of claim 16, wherein said connecting segment is disposed between said inner section free end and said outer section free end.

18. The tag coupler of claim 17, wherein said capacitive sections comprise a capacitive section at a portion of said connecting segment.

19. The tag coupler of claim 18, wherein said capacitive sections further comprise another capacitive section at a portion of said inner section free end.

20. The tag coupler of claim 18, wherein said capacitive sections further comprise another capacitive section at a portion of said outer section free end.

21. The tag coupler of claim 16, wherein said inner section free end extends towards said outer section.

22. The tag coupler of claim 16, wherein said outer section free end extends towards said inner section.

23. The tag coupler of claim 16, wherein said connecting section extends from the outermost winding of said inner section to the innermost winding of said outer section.

24. The tag coupler of claim 16, and further comprising a substantially planar substrate having an electrically non-conductive mounting surface, said mounting surface being for mounting said conductive member.

25. A method of forming a radio frequency identification (RFID) tag, said method comprising:
providing a substantially planar and electrically non-conductive substrate having a mounting surface;
forming a substantially planar and electrically conductive member on said mounting surface, said conductive member having:
an inner section comprising:
one or more windings;
a broken section between a first and a second open positions in one of said windings; and
an inner section free end extending from said first open position;
an outer section, being disposed near the edge of said mounting surface and substantially surrounding said inner section, said outer section comprising:
one or more windings with its innermost winding being significantly separated from the outermost winding of said inner section with respect to the average pitch value of said inner section windings; the width of said outer section windings may be different from the width of said inner section windings; and
an outer section free end extending from the outermost winding of said outer section;
said second open position of said inner section and the inner most winding of said outer section being connected via a connecting section, said connecting section being disposed between said inner section free end and said outer section free end;
attaching at least one dielectric strip onto one or more portions of said conducive member; and printing a conductive bridge which crosses over said connecting segment and spans from said inner section free end to said outer section free end onto said at least one dielectric strip;

wherein said at least one dielectric strip disposed between said conductive bridge and said conductive member to thereby form one or more capacitive sections along said at least one dielectric strip.

26. The method of claim 25, wherein said forming comprises: laminating a conductive material onto said mounting surface; and etching said conductive material to thereby form said conductive member.

27. The method of claim 25, wherein said attaching comprises printing said at least one dielectric strip onto a portion of said connecting segment.

28. The method of claim 27, wherein said attaching further comprises printing said at least one dielectric strip onto a portion of said inner section free end.

29. The method of claim 27, wherein said attaching further comprises printing said at least one dielectric strip onto a portion of said outer section free end.

30. The method of claim 27, wherein said attaching further comprises curing said at least one dielectric strip.

31. The method of claim 25, and further comprising mounting a semiconductor device to at least two conductive pads of said conductive member.

32. The method of claim 25, and further comprising applying an adhesive onto an attachment surface of said non-conductive substrate, said attachment surface being opposite to said mounting surface.

33. The method of claim 25, and further comprising shaping said non-conductive substrate for attachment to a component.

34. The method of claim 33, wherein said shaping comprises punching a spindle aperture at a center portion of said non-conductive substrate.

35. The method of claim 25, wherein said forming comprises forming an indented section at said inner section, said indented section having two free ends, each of said two free ends extending from a winding of said inner section.

36. The method of claim 35, wherein said attaching comprises printing at least one dielectric strip onto one or more portions of said indented section.

37. The method of claim 36, wherein said attaching further comprises curing said at least one dielectric strip.

38. The method of claim 36, wherein said printing comprises printing a conductive bridge onto at least one portion of said at least one dielectric strip to thereby form one or more capacitive sections along said at least one dielectric strip at said indented section.

* * * * *